(12) United States Patent
Castet et al.

(10) Patent No.: US 11,481,180 B2
(45) Date of Patent: Oct. 25, 2022

(54) SYSTEM AND METHOD FOR SIMULTANEOUS MANAGEMENT OF A PLURALITY OF DESIGNATION PERIPHERALS

(71) Applicant: IMMERSION, Bordeaux (FR)

(72) Inventors: Julien Castet, Begles (FR); Loic Semelle, Saint Loubes (FR); Cédric Kervegant, Merignac (FR)

(73) Assignee: IMMERSION

( * ) Notice: Subject to any disclaimer, the term of this patent is extended or adjusted under 35 U.S.C. 154(b) by 232 days.

(21) Appl. No.: 16/754,924

(22) PCT Filed: Oct. 19, 2018

(86) PCT No.: PCT/EP2018/078792
§ 371 (c)(1),
(2) Date: Apr. 9, 2020

(87) PCT Pub. No.: WO2019/077142
PCT Pub. Date: Apr. 25, 2019

(65) Prior Publication Data
US 2020/0293256 A1   Sep. 17, 2020

(30) Foreign Application Priority Data

Oct. 19, 2017  (FR) ...................................... 1759852

(51) Int. Cl.
*G06F 3/147* (2006.01)
*G06F 3/041* (2006.01)
(Continued)

(52) U.S. Cl.
CPC .......... *G06F 3/147* (2013.01); *G06F 3/03545* (2013.01); *G06F 3/0416* (2013.01); *G06F 13/4282* (2013.01); *G06F 2213/0042* (2013.01)

(58) Field of Classification Search
CPC .... G06F 3/147; G06F 3/03545; G06F 3/0416; G06F 13/4282; G06F 2213/0042;
(Continued)

(56) References Cited

U.S. PATENT DOCUMENTS 8,165,732 B2 * 4/2012 Corbefin ................. G06F 3/023
701/3
8,310,520 B2 * 11/2012 Gopal ................. H04L 12/1881
348/14.08
(Continued)

FOREIGN PATENT DOCUMENTS

DE       102013202818       8/2014

OTHER PUBLICATIONS

Anonymous: "KVM Splitter"; Wikipedia, last edited Dec. 24, 2015; entire document.
(Continued)

*Primary Examiner* — Vijay Shankar
(74) *Attorney, Agent, or Firm* — Perman & Green, LLP (57) ABSTRACT

A recomposer allows connecting a plurality of designation peripherals to the same central unit of a computer system. The recomposer includes inputs for exchanging, with each of the designation peripherals, data normally exchanged with the central unit; includes an output for exchanging data with the central unit; includes digital processing means to transform the data received by the recomposer into emitted data. The data emitted are compliant in content and in structure to data which would be emitted by a designation peripheral with a single active surface, and correspond individually, on the single active surface, to the actions carried out with the designation peripherals. Several designation peripherals connected to a recomposer constitute an assembly which is connected to a central unit of a computer system and seen as a single designation peripheral.

14 Claims, 3 Drawing Sheets

(51) Int. Cl.
  *G06F 3/0354* (2013.01)
  *G06F 13/42* (2006.01)
(58) Field of Classification Search
  CPC .. G06F 2203/0382; G06F 3/033; G06F 3/038;
  G06F 3/023
  See application file for complete search history.

(56) References Cited

U.S. PATENT DOCUMENTS

| | | | |
|---|---|---|---|
| 10,547,709 B2* | 1/2020 | Burningham | G06Q 30/01 |
| 10,833,969 B2* | 11/2020 | Guim Bernat | G06F 16/2379 |
| 2009/0319099 A1 | 12/2009 | Corbefin et al. | |

OTHER PUBLICATIONS

Anonymous: "NTI VOPEX Touch Screen Sharer NTI VOPEX-4MM Touchscreen Sharer"; Dec. 31, 2015; entire document.
Anonymous: "Serial Touch Screen KVM Splitters and Multiplexers for 4 Workstations from Vetra, VIP-884-KMV-TS" Dec. 31, 2003; entire document.
Anonymous: "Two Workstation Touch Monitor KVM Splitter-Multiplexer with Extension"; Dec. 31, 2001; entire document.
International Search Report issued in International Patent Application No. PCT/EP2018/078792 dated Jan. 18, 2019.

* cited by examiner

SYSTEM AND METHOD FOR SIMULTANEOUS MANAGEMENT OF A PLURALITY OF DESIGNATION PERIPHERALS

CROSS-REFERENCE TO RELATED APPLICATIONS

This application is a National Stage of International Application No. PCT/EP2018/078792, having an International Filing Date of 19 Oct. 2018, which designated the United States of America, and which International Application was published under PCT Article 21(2) as WO Publication No. 2019/077142 A1, which claims priority from and the benefit of French Patent Application No. 1759852, filed on 19 Oct. 2017, the disclosures of which are incorporated herein by reference in their entireties.

BACKGROUND

1. Field

The disclosure belongs to the field of computer systems and particularly human-machine interfaces.

The disclosure relates particularly to a system and a method for the management of several designation peripherals by which an operator interacts with a computer, when these designation peripherals are connected simultaneously in the same computer system.

2. Brief Description of Related Developments

In the field of peripherals allowing a user of a computer system to act on said computer system, it is known to implement devices actuated by the user to interact on a screen with graphic elements.

Among these devices there are particularly keyboards, mice, styli, touch tablets or else touch screens.

In order to ensure that these devices work with many computer systems, these devices communicate with the computer system by sending data frames formatted according to a standardised protocol called HID ("Human Interface Device").

Generally, the actions carried out by the operator, through these devices, are visualised on one or more display surfaces of the computer system. This allows the operator to act according to his interaction needs, such as selection, validation, plots, etc.

It is possible to connect several of these devices, for example several keyboards or several mice, to the same computer system, but in these cases, only one of the redundant devices can be used at a given instant. Thus, a mouse allows acting on the position of a pointer on the display surface and the position of the pointer becomes practically impossible to manage if several mice are activated simultaneously.

This case is not penalising in practice when it is not necessary to use two mice simultaneously even when they are connected, such as for example on a single-user computer station. On the other hand, this prohibits that two people each use a mouse on the same computer station in the context of collaborative work.

In the case of designation systems of the touch screen or graphic tablet type, it may be desired to act simultaneously on the sensitive surfaces of these systems.

Thus, it is now widespread to use touch screens which adapted to detect and manage several simultaneous contact points to obtain particular effects by the software which uses the information of the contact points. However, this multiple contact possibility is today reserved for a single touch surface and it is not possible, without specific computer processing, to act simultaneously on different touch surfaces.

This limitation is due to the difficulty of combining individual and standardised links between the designation peripherals and the central unit of the computer system.

Figure 1:
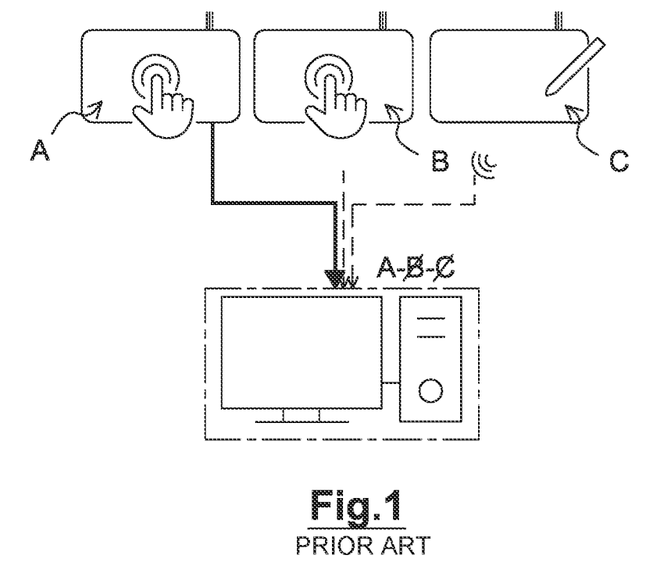
FIG. 1: already mentioned, the principle of "alternative" operation of various designation peripherals in a computer system, a central unit of which receives signals from these various peripherals according to the principles of the prior art.

When the computer system includes several designation peripherals (A, B, C), these various peripherals are each connected to the central unit individually by a dedicated link, today most often a USB link ("Universal Serial Bus"), as illustrated in FIG. 1.

It is then necessary in this hardware and logical configuration, to stop acting with a designation peripheral in order to be able to act with another, at least in a satisfactory manner from a functional point of view.

So that the designation peripherals as independent as possible of the computer system to which they are connected, a specific HID standard, superimposed on the USB standard, defines the content and structure of the data exchanged between the terminal and the central unit.

A disadvantage of this architecture comes from the fact that it is not possible to take into account simultaneous actions on several designation peripherals without conflict in the context of coordinated actions of the operator(s).

To overcome this problem, software solutions have been developed, but these solutions are specific to the operating system and the application implemented.

The qualities of universality that are expected of the designation peripherals, in particular touchscreen devices and graphic tablets, are then lost by users of computer systems.

SUMMARY

The present disclosure provides a solution to these problems of simultaneous implementation of a plurality of active surface designation peripherals by a computer system. This by means of a recomposer arranging the data emitted by a plurality of active surface designation peripherals, into a set of data including all the data characterising the actions carried out by an operator on the active surfaces of the various designation peripherals and having the structure of the data which are emitted by a single designation peripheral.

For this purpose, the disclosure relates to a recomposer, for connecting a plurality of designation peripherals to the same central unit of a computer system.

The recomposer:

includes inputs for exchanging, with each of the designation peripherals, when said designation peripheral is connected to the recomposer, data normally exchanged with the central unit when said designation peripheral is directly connected to the central unit;

includes an output for exchanging data with the central unit, when the recomposer is connected to the central unit;

includes digital processing means configured to transform the data received at the inputs of the recomposer into data outputted from the recomposer;

the data outputted being compliant in content and in structure to data which would be emitted by a designation peripheral including a single active surface;

the outputted data characterising individually, at each instant, on the single active surface, actions carried out with the designation peripherals, actions characterised by the data received as inputs.

By exchanging data with the recomposer, the central unit is no longer confronted with inconsistencies and conflicts encountered when the plurality of designation peripherals is directly connected to the central unit. The recomposer having transformed the data received from the various designation peripherals, to give them the values and the structure corresponding to their generation by a single designation peripheral combining the functional features of the various connected designation peripherals. The designation peripheral combining said functional features is comparable to a virtual designation peripheral resulting from a digital assembly of the real designation peripherals connected to the recomposer.

The recomposer of the disclosure includes all or part of the following features insofar as they are technically combinable.

In one aspect of the disclosure, the digital processing means include:

at least one analyser configured to extract, from the data received as inputs from each of the designation peripherals connected to said recomposer, a table of variable data and descriptors of said designation peripheral;

at least one configurator configured to define the dimensions and position of an active surface associated with each of the designation peripherals connected to said recomposer in a coordinate system of the single active surface;

at least one controller for transforming variable data of the data received as inputs into variable data of the outputted data;

at least one conditioner configured to structure the data to be outputted in accordance with a communication protocol comprised by the central unit to which the recomposer must be connected.

These various functions can be carried out by one or more microcontroller(s), integrated in a casing, or in a set of interconnected casings, of the recomposer. The configuration can be of an independent recomposer to be quickly connected to a central unit without hardware intervention on the central unit, or mounted on an electronic board to be permanently installed in a central unit.

In one aspect of the disclosure, the configurator, for each active surface associated with a designation peripheral connected to the recomposer, defines dimensions and a position, in the single active surface, of an area corresponding to the active surface associated with the designation peripheral by:

a scaling of each of an abscissa axis and of an ordinate axis of the active surface known in a coordinate system of this active surface to a coordinate system of the single active surface;

a position of a reference point of the active surface in the coordinate system of the single active surface.

Each active surface associated with a designation peripheral is thus defined as a particular area of the single active surface wherein the actions of an operator carried out with the designation peripheral are characterised.

In one aspect of the disclosure, coordinates of a point designated on the active surface in the coordinate system of a designation peripheral, transmitted in the variable data received on an input of the recomposer or produced by the recomposer from these received variable data, are transformed into coordinates of said point, designated on the active surface, in the coordinate system of the single active surface and incorporated into the variable data of the data emitted by the output.

In one aspect of the disclosure, the recomposer is configured to receive, on at least one input, data conforming to the requirements of an open standard, for example the USB standard and the HID overlay to said USB standard.

In one aspect of the disclosure, the recomposer is configured to receive, on at least one input, data defined by a protocol called "proprietary" protocol.

In one aspect of the disclosure, the outputted data comply with the requirements of an open standard, for example the USB standard and the HID overlay to said USB standard.

In one aspect of the disclosure, at least one input corresponds to a wireless link to which a wireless designation peripheral can connect, for example by a radio link or by an optical link.

The disclosure also relates to an assembly including a recomposer conforming to the recomposer of the disclosure and including at least two designation peripherals.

It is thus possible to create a complex designation peripheral resulting from the assembly of several existing designation peripherals and thus to create designation surfaces of larger dimensions resulting from an assembly of designation surfaces associated with different designation peripherals and or associating ordinarily incompatible functions.

In one aspect of the disclosure, at least one designation peripheral of this assembly includes an active surface associated with a touch screen.

In one aspect of the disclosure, at least one peripheral of this assembly is a stylus associated with a designation surface.

In one aspect of the disclosure, at least one designation peripheral of this assembly is a scrolling designation peripheral, such as a mouse or a trackball, whose signals are processed to define a position on a designation surface.

The disclosure also relates to a computer system including such an assembly, incorporating a recomposer of the disclosure, wherein the output of the recomposer is connected to a central unit of the computer system.

The disclosure also relates to a method for connecting several designation peripherals to the same central unit in a computer system, to allow the simultaneous interoperability of said designation peripherals, including the steps of connecting said designation peripherals on inputs of a recomposer of the disclosure and to connect an output of this recomposer to the central unit so that the designation peripherals connected to the recomposer are seen by the central unit as a single designation peripheral.

In one aspect of the disclosure of this method, the method includes a step of parametrizing the recomposer, this parameterisation step including defining an arrangement of the active surfaces, associated with each of the connected designation peripherals, in the single active surface.

It is thus possible to achieve a consistency of the physical arrangement of the active surfaces with that which is virtually assigned thereto in the single active surface.

BRIEF DESCRIPTION OF THE DRAWINGS

The disclosure is described with reference to the figures which are given by way of a non-limiting example of an aspect of the disclosure, which schematically shows.

In the figures, the drawings of the various parts of the system and of its components are represented symbolically.

DETAILED DESCRIPTION

Figure 2:
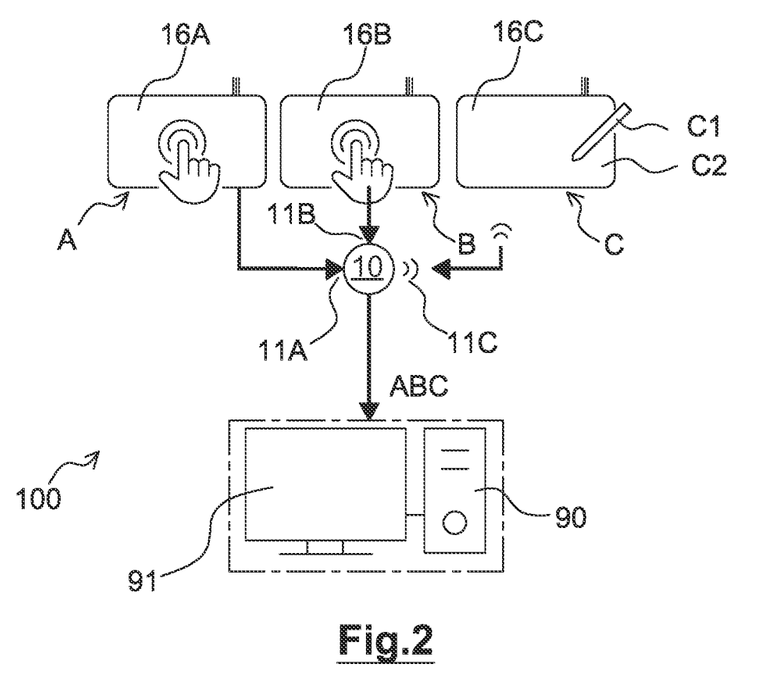
FIG. 2: the principle of the simultaneous operation of various designation peripherals in a computer system, a central unit of which receives the signals from these various peripherals by a data recomposer according to the disclosure.

The general principle of the disclosure is presented in FIG. 2 which schematises a computer system 100 including a central unit 90 to which a display surface 91 is connected and including three designation peripherals A, B, C, intended to be used, simultaneously or not, by one or more operators. It will be noted here that the designation peripherals considered below are peripherals restoring the position of a pointer on a display surface.

Such designation peripherals implement, for example, designation surfaces to restore the position, on an active surface, or in the proximity and above the active surface, of a physical pointer such as a finger or a stylus.

Such designation peripherals implement, for example, measurements of displacement of a cursor, in the manner of a mouse or of a trackball, from which displacements a position of a pointer is defined on a display surface, in particular by integrating displacements.

It will be understood here that the disclosure is integrated into a conventional computer system wherein peripherals dialogue with a central unit through standardised digital communication buses, for example buses with the USB ("Universal Serial Bus") standard widely used today.

Although other existing or future "central unit-peripheral" communication standards can be implemented in the disclosure, reference will be made in the description to the communication buses meeting the USB standard and also to the particular case of the HID (Human Interface Device) overlay to the USB standard.

The applicable standards, known to the person skilled in the art, are particularly available from "USB Implementers Forum, Inc.".

It will be noted here that several considered designation peripherals can be associated with the same display surface, for example in the case of a touch screen a screen surface of which is greater than those of the active surfaces of the designation peripherals, and or can be associated with several screens, the example of juxtaposed touch screens can be mentioned.

The display surface 91 of FIG. 2 is therefore a symbolic representation of a display device which includes one or more screen(s), this aspect of the display system having no particular impact on the disclosure.

In the following description, only some of the data transmitted by the designation peripherals A, B, C, to a central unit 90 of a computer system 100, which are necessary for the understanding of the disclosure and its operation will be considered.

Particularly not all communication protocols and the detailed structure of the data that are transmitted in accordance with the requirements of the applicable standard, for example the USB standard: "Universal Serial Bus Specification" available at various revisions and to which it is possible to refer, will be developed.

In the example illustrated in FIG. 2, two first type designation peripherals A and B each include an active surface arranged on the surface of the screen 91 to constitute one or more touch screen(s).

Each designation peripheral A, B generates data which is transmitted, via a digital USB bus, in accordance with the requirements of the HID standard. The data could however be transmitted via another type of bus and according to another transmission standard without calling into question the principles of the disclosure.

The designation peripherals are therefore standard equipment, in this example meeting the HID communication standard, without any technical specificity imposed for the implementation of the disclosure.

In the following description, the expressions "designation peripheral" and "HID peripheral" will be used interchangeably to designate a designation peripheral including an active surface and configured to transmit in particular the absolute position in a reference frame of the active surface of a point designated by an operator's finger or by a suitable tool, for example a stylus.

It should be noted that the reference to the HID standard is here a particular case of standard, taken as an example because of its frequent use currently in the field of designation peripherals, but that this choice is not limitative of the disclosure which can easily adapt to another communication standard.

The computer system 100 also implements a recomposer 10.

The recomposer 10 receives, on inputs 11A, 11B of said recomposer, data according to a standardised format, in the example in HID format, emitted by the various HID peripherals, here from each of the designation peripherals A, B.

The recomposer 10 processes the data in standardised format, received on the various inputs 11A, 11B, to reconstruct composite data emitted on a single output 17 of said recomposer according to the standardised format.

It should be understood here that the composite outputted data meet the requirements of a standard and therefore correspond, for the central unit 90, to the data sent by a single peripheral, here according to the HID standard.

This specific construction differs from that of USB hubs or switches well known in the field of communication networks between computers and which ensure the successive transmission of incoming data in a serial mode or without transformation on the background of this data.

In the recomposer 10 of the disclosure, data received as input, coming from at least two HID peripherals, are received on different inputs, and the data emitted on the single output 17, in HID format, combine information contained in the data received at a given instant so that the assembly including the recomposer 10 and the HID peripherals connected thereto is seen by the central unit 90 as if it was a single peripheral meeting the HID communication standard, with which it therefore communicates without installing specific software or drivers on said central unit.

It is obvious to a person skilled in the art that the recomposer 10 must be designed to take into account the problems of synchronisation and processing of the signals emitted or received by the different peripherals, and to take over the different constraints of the communication standard used, both in reception and in emission. Therefore, the recomposer will particularly include buffer memories for the digital data received as input or to be outputted and microcontrollers as much as necessary.

The data emitted by the recomposer 10 are therefore constructed from the data received by said recomposer, on different inputs, available at a given instant.

The recomposer is advantageously designed around a microcontroller, including conventional elements such as processors, memories, peripheral units, input-output interface, programmed in its main aspect to execute the transformations applied to the data received on the inputs and to construct the output data whose features are described below.

Figure 3:
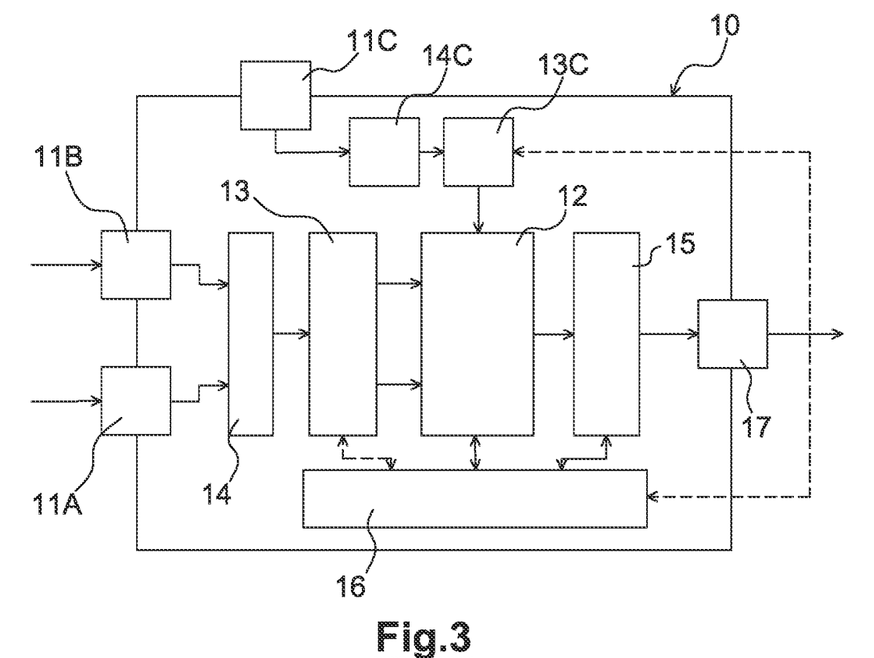
FIG. 3: an example of internal architecture of an aspect of a recomposer according to the disclosure.

FIG. 3 illustrates an example of internal architecture of a recomposer 10 in accordance with the disclosure and the operation of which, schematically shown in FIG. 5, will be described in the case of the use of the HID standard for designation peripherals with active surfaces.

In FIG. 3 from left to right there is:
- the inputs 11A, 11B, for example associated with quick connectors to the USB standard, on which the data transmission buses generated by each of the HID peripherals are connected;
- a conventional USB hub 14 implemented to transmit the received data to an analyser 13;
- the analyser 13;
- a controller 12;
- a conditioner 15;
- an output 17 on which a data transmission bus is connected, in this exemplary aspect a serial bus to the USB standard.

The hub of FIG. 3 also includes a configurator 16 linked to the analyser, the controller and the conditioner.

FIG. 3 also shows a radio receiver 11c transmitting received signals to an annex controller 14' then to an annex analyser 13' connected to the controller 12 and to the configurator 16.

The functions and advantages of this radio receiver, the annex controller and the annex analyser will be presented later.

Considering the case of two HID peripherals, A and B, connected on the inputs 11A and 11B vice versa, each of them transmits a set of data relating to its features and to its current state.

Said data are transmitted, via the USB hub 14, to the analyser 13 which interprets the data received according to the HID standard in order to extract the information necessary for the reconstruction of the data to be sent by the recomposer.

There are two types of data:
- HID peripheral descriptors;
- HID peripheral variable data.

The descriptors are "fixed" data, if necessary parameterizable, characterising the HID peripheral regardless of the designations that are made, and which may be different from one HID peripheral to another. They generally allow a central unit 90 to know the features of the HID peripheral from which it receives variable data so that an application implemented on said central unit is able to correctly interpret variable data received from this same HID peripheral. In the case of the disclosure, they are processed by the analyser.

Variable data are related to the use of the HID peripheral. On a touch surface, these data indicate that a finger is in contact with the active surface and give the position of the finger in the form of coordinates consistent with the descriptors. These data will be interpreted by an application implemented on the central unit, assuming that they comply with the HID standard.

As already mentioned, the peripherals compliant with the USB/HID standard can be supported by all applications and on any operating system, having integrated the standard in question in its communication protocols, without the need to implement specific drivers, as in the case of systems using communication protocols called "proprietary" communication protocols.

Figure 5:
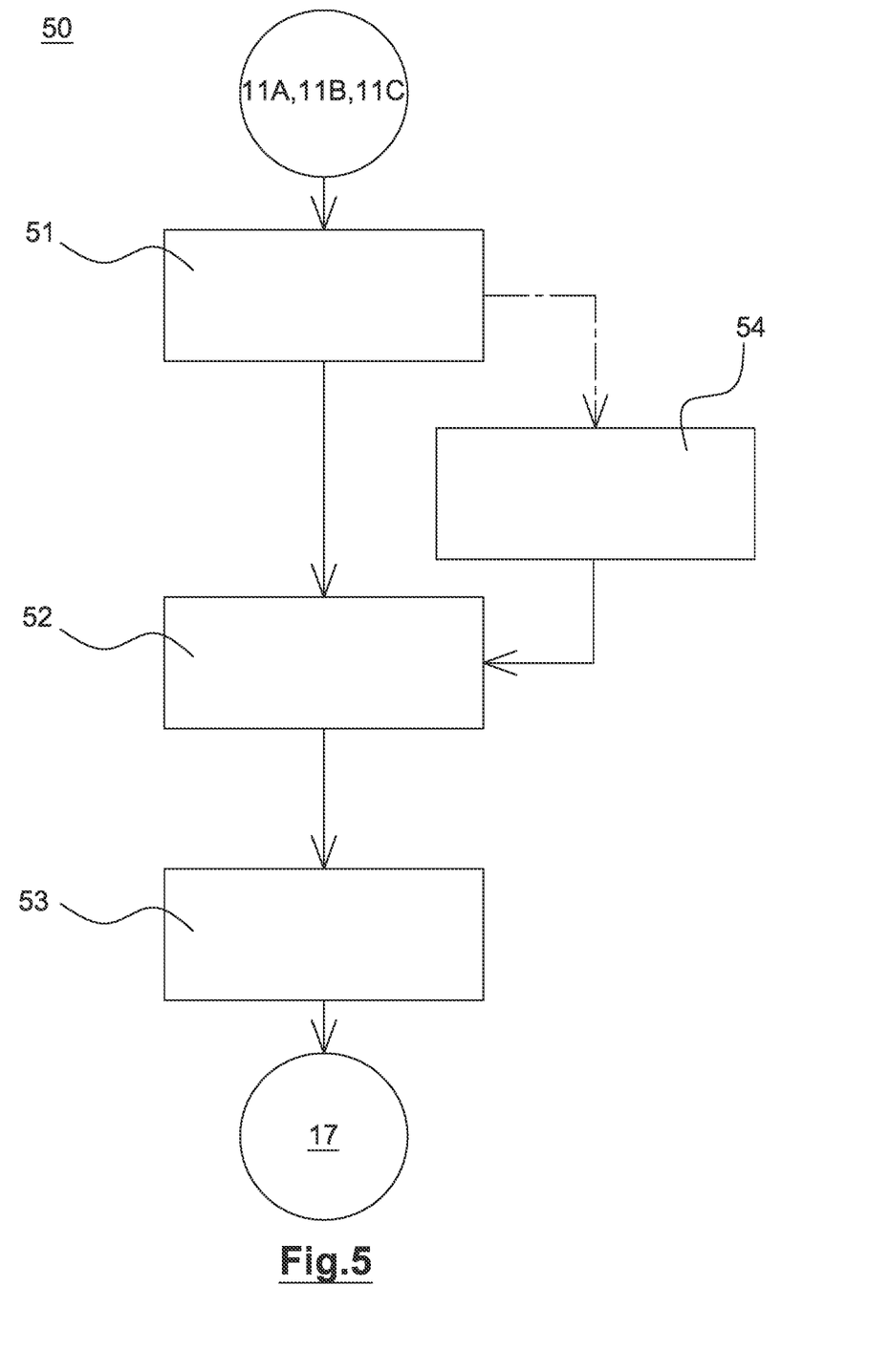
FIG. 5: a representation of the main steps of the processing method of the data the designation peripherals by the recomposer.

According to the method 50 for transforming the input data schematised in FIG. 5, in a first analysis step 51, the analyser 13 will thus reconstruct a data table, coming from the descriptors and the variable data, of each of the HID peripherals concerned by a processing by the controller.

In the case of a cursor HID peripheral, such as a mouse, the data relating to the displacement of the cursor are interpreted by the controller to calculate a position of a pointer controlled by said cursor on a designation surface allocated to said peripheral.

In a second description step 54, the configurator 16 processes the descriptors of each of the HID peripherals A, B, so as to develop a virtual assembly of the designation surfaces 16A, 16B of the HID peripherals A, B, to define a single virtual active surface 16U representative of a physical arrangement of the designation surfaces of said peripherals.

This physical arrangement of the designation surfaces is known to the recomposer in a simple case, for example when the configurator is intended for a predefined assembly of designation surfaces, the example of active surfaces of prepositioned touch screens can be mentioned.

In another aspect of the disclosure, the physical arrangement is communicated in the form of parameters transmitted to the recomposer during an initialisation or parameterisation step, for example by a user of the computer system 100 via the central unit 90.

Figure 4:
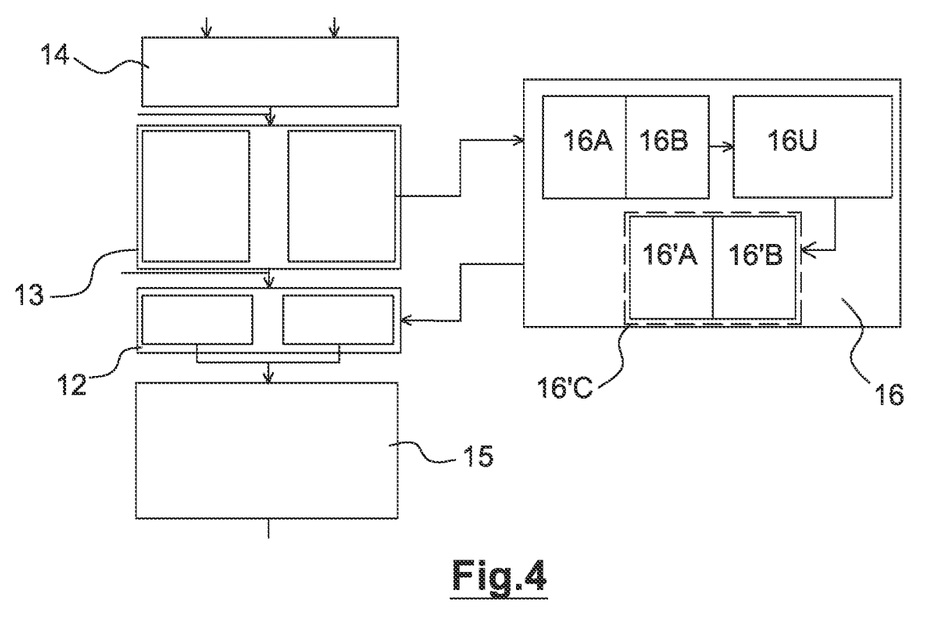
FIG. 4: a synoptic representation of the data processing in the recomposer.

FIG. 4 particularly illustrates a simple example of assembly defining such a single active surface 16U.

The HID peripherals considered include, in this example, touch surfaces sensitive to touch, capable of identifying the position of a finger touching the touch surface.

In this example, two display screens each covered with a touch surface are juxtaposed, substantially edge to edge, to form a composite screen 91 having the appearance of a single screen. In this configuration, the simulated active surface 16U physically corresponds to the assembly of touch surfaces covering the screens.

However, since the designation peripherals including these touch screens are a priori "off-the-shelf" equipment, it is not necessary that the two touch surfaces have the same features, and they can particularly have different physical dimensions, different logical dimensions (resolutions), different detection technologies. The descriptors of each of the corresponding HID peripherals are therefore not only distinct but may be different.

The single active surface 16U also corresponds to descriptors, arbitrarily selected or shaped, into which the descriptors of the HID peripherals connected to the recomposer 10 must be converted. The conversion performed in the configurator 16 mainly determines the transformations by which a point of a designation surface of a designation peripheral expressed by coordinates in a reference system of said designation surface, corresponds on the single active surface 16U at a point of said single active surface, expressed by coordinates in a coordinate system of said single active surface.

By way of example, the configurator of FIG. 4 illustrates the case of two rectangular designation surfaces joined by an edge of each of the same length, a height in the illustration, but points of said designation surfaces being determined in coordinate systems with different scales for the two designation surfaces.

In the coordinate system of the first designation surface 16A, here associated with the display surface of the first HID peripheral A, a scale of said touch surface is determined (by construction) by the coordinates of a point higher to the right: [X=2353; Y=1322] compared to an origin of a point lower to the left: [X=0; Y=0] of said first designation surface, X being an abscissa along a width and Y an ordinate along a height of said designation surface.

In the coordinate system of the second designation surface 16B associated with the display surface of the second HID peripheral B, a scale of said designation surface is determined (by construction) by the coordinates of a point higher to the right: [X=19353; Y=10886] compared to an origin of a point lower to the left: [X=0; Y=0] of said second designation surface.

The single active surface 16U, representative of the assembly of the two designation surfaces, is associated with a coordinate system having the coordinates of a point higher to the right: [X=32768; Y=32768], values selected arbitrarily, compared to an origin of a point lower to the left: [X=0; Y=0] of said single active surface.

This single active surface 16U then includes two areas, a first area 16A' of which is isomorphic of the first designation surface 16A and a second area of which 16B' is isomorphic of the second designation surface 16B. The relative positions between said first and second areas are also those between the first real designation surface 16A and the second designation surface 16B.

Thus, in the coordinate system of the single touch surface 16U, the first area 16A' associated with the display surface of the first HID peripheral A is here determined by the coordinates of a point higher to the right: [X=16384; Y=32768] and an origin at a point lower to the left: [X=0; Y=0].

The second area 16B' associated with the display surface of the second HID peripheral B is in turn determined by the coordinates of a point higher to the right: [X=32768; Y=32768] and an origin of said second designation surface at a point lower on the left: [X=16385; Y=0]. The offset in X of the origin point of said second area corresponds to the juxtaposed arrangement of the two designation surfaces 16A, 16B.

In this simple example, the two touch surfaces 16A and 16B have the same physical dimensions, which leads to two areas of the same widths along X and the same heights along Y.

However, this condition is not required.

Indeed, the designation surfaces can have different dimensions, different shapes, different orientations between each other. They can also be totally or partially superimposed.

The area of the single active surface 16U associated with a designation surface may be a linear transformation of the physical touch surface or may be transformed by non-linear laws to produce particular effects, for example scale modifications depending on the position of a designated point on the designation surface or on the curvature effects.

Areas corresponding to different designation surfaces are not necessarily arranged in a similar manner to the physical arrangement of said designation surfaces, and in the single active surface 16U of the areas of the different designation surfaces can be brought closer or apart or more or less superimposed. An area can also declare locations of a designation surface as non-active. This latter configuration allows, for example, ensuring the continuity of an action such as a sliding of an operator's finger, when there is a non-active area between two juxtaposed designation surfaces concerned by the sliding.

For example, in the simple described case of two designation surfaces, both designation surfaces 16A and 16B can have the same physical height as shown but with different widths, case which is not shown, and in this case the dimensions along Y of the two areas 16A' and 16B' will be identical, and the dimensions along X will be different and in the ratio of the physical widths of said designation surfaces. They can also have different orientations: by 90 or 45 degrees for example to form touch mosaics. They may also not be contiguous to correspond to a physical arrangement of the designation surfaces.

The two designation surfaces 16A and 16B can also have different physical heights, case which is not shown. In this case the single rectangular active surface 16U will not be totally active.

In a third conversion step 52, the data characterising the areas 16A', 16B', associated with the HID peripherals A, B, established by the configurator 16 during the description step 54, are transmitted to the controller 12.

In this conversion step, for each HID peripheral connected to the recomposer 10, the controller 12 transforms the variable data relating to the operation of the HID peripheral so that said variable data transmitted by said HID peripheral in correspondence with the descriptors of said HID peripheral are expressed after transformation of the single active surface 16U in correspondence with descriptors.

Typically, the designated position, for example the detected position of a finger, on a designation surface of an HID peripheral, which is transmitted by said HID peripheral in the data as a pair of values (Xf, Yf) corresponding to the designated position in the coordinate system of the considered designation surface, is converted in the coordinate system of the single active surface 16U by a scale factor on each of the axes and by an offset from the origin of the coordinates, a scale factor and origin offset depending on the area of the single active surface 16U corresponding to the designation surface considered.

Thus in the illustrated example previously exposed, a point of coordinates (Xfa, Yfa) of the first HID peripheral A will be transformed by simple homothety, without origin offset because the origins are coincident, in a point of coordinates (Xga, Yga) in the coordinate system of the single active surface 16U:

$$Xga = Xfa \times 16384/2353$$

$$Yga = Yfa \times 32768/1322$$

and a point of coordinates (Xfb, Yfb) of the second HID peripheral B will be transformed by homothety and origin offset into a point of coordinates (Xgb, Ygb) in the coordinate system of the single active surface 16U:

$$Xgb = (Xfb \times 16384/19353) + 16385$$

$$Ygb = Yfb \times 32768/10886$$

In a fourth formatting step 53, the HID conditioner 15 receives:

from the configurator 16, the data for reconstructing the descriptors of the single active surface 16U in accordance with the specifications of the HID standard, and;

the variable data, resulting from the transformation during the step of converting the variable data transmitted by each of the HID peripherals connected to the recomposer 10, carrying said variable data of the HID peripherals and being in the form of variable data related to the operation of the single active surface 16U, then;

reconstructs the data table, incorporating the descriptors and the variable data of the single active surface 16U to emit said data according to the conditions of the standard relating to HID peripherals, that is to say the data corresponding to those which would be emitted by a single designation peripheral of a designation surface the single active surface 16U.

When the recomposer 10 is in operation, the different steps of the method 50 for transforming the input data are carried out repeatedly when new variable data must be transformed.

However, the second analysis step only needs to be implemented when the recomposer is put into service in a computer system and when the configuration of the designation peripherals connected to said recomposer is modified, for example by adding a designation peripheral.

Thus, it results from the disclosure that a plurality of HID peripherals A, B, connected to the recomposer 10 is "seen" by the central unit 90 as a single HID peripheral including the combined designation capacities of the HID peripherals of said plurality of HID peripherals which are able to be implemented simultaneously by simple connection ("plug and play").

The recomposer 10, associated with all of the designation peripherals which are connected thereto, therefore behaves vis-à-vis the central unit 90 as a single designation peripheral for which the known operating problems no longer arise when several designation peripherals are individually directly connected to the central unit.

As already indicated in the introduction to the description of this exemplary aspect, details related to the protocols exposed in the USB and HID standards which are associated with the operation of HID peripherals are not presented in the description, these details known to the person skilled in the art not providing useful information for the understanding of the disclosure.

Furthermore, the disclosure can be implemented for designation devices using data transmission standards other than the HID standard, although this standard is widely used today.

In one aspect of the disclosure, the recomposer 10 incorporates at least one input for a second type designation peripheral, including an active surface and designed to communicate with a central unit by specific protocols not meeting a public standard, designated generically by the expression "proprietary system", or to a standard different from that used for the designation peripherals of the first type connected to said recomposer.

In this aspect of the disclosure, the data transmitted by this designation peripheral of a second type is transformed by the recomposer depending on their structures to reconstruct a data table of a form equivalent to those of the other designation peripherals connected to said recomposer.

The data received from this designation peripheral of a second type is then processed like those of the designation peripherals of the first type and taken into account in the formatting step 53 to be incorporated into the data table of the single active surface 16U.

It will be noted that a second type designation peripheral, at least some of them, does not necessarily include the descriptors necessary to assign to the active surface a particular area of the single active surface 16U. In this case, an arbitrary area will be assigned to said designation peripheral, for example the entire single active surface 16U, or an area 16A, 16B of another designation peripheral A, B, or else an area selected by an operator from a connected computer station.

An example of this aspect is illustrated in FIG. 2 and in FIG. 3.

In this example, the second type designation peripheral C is a stylus C1 associated with an active surface C2. In the illustrated case, the peripheral C transmits the data by a radio link (Wi-Fi, Bluetooth®, etc.), essentially for practical reasons.

Such a second type designation peripheral, does not use the HID standardised communication standard (otherwise it would be considered as a first type designation peripheral), and generally requires driver software which must be installed on the central unit for its implementation.

Such driver software is specific to the operating system installed on the central unit 90 and sometimes are not available for some operating systems, which limits the use of these peripherals to the operating systems for which the driver software are available.

In the illustrated aspect of the recomposer 10 of the disclosure, said recomposer includes, as illustrated in FIG. 3, in addition to the features described above to support two HID peripherals:

a receiver 110;

an annex controller 14C;

an annex analyser 13C.

The receiver 110, here a radio receiver, receives the data emitted by the stylus.

These data include at least one identification of the peripheral so that the recomposer can assign the corresponding interactions thereto on the surface C2.

These operating data are, under conditions of ordinary use, normally extracted and interpreted by the driver software specifically adapted to the peripheral considered.

In the case of the recomposer 10, the data received by the radio controller 14C are processed by the annex analyser 13C to obtain the variable data related to the use of the graphic tablet.

For this purpose, the annex analyser 13C includes for example a firmware which can be installed during the manufacture of the recomposer or downloaded into a flash memory, for example from the central unit 90.

Advantageously, the stylus descriptors will be incorporated into the annex analyser 13C.

The variable data and the descriptors determined for the second type designation peripheral C are then transmitted to the controller 12.

The controller 12 then reconstructs for said second type designation peripheral, such as the considered stylus, a data table consistent with the data tables produced by the HID peripherals, and said second type designation peripheral is then processed as a first type designation peripheral, which is associated with a designation surface wherein said designation peripheral is active, for example, in the case of a stylus C1 the active surface C2 associated with said stylus.

The active surface of the second type designation peripheral is then associated with an area 16'C of the single active surface 16U.

Said area 16C' is for example equal to the single active surface 16U so that the stylus C1 allows designating any point of the display surface 91 corresponding for example to the single active surface 16U.

In practice, all or part of the area 16C' on which the stylus C1 acts can be juxtaposed with the other areas 16A', 16B' of the designation peripherals 16A, 16B, and or may cover all or part thereof.

After having been reconstructed by the controller 12, the data linked to the second type designation peripheral C have the same structure as the data of the other designation peripherals A, B, so that they are taken up and processed as the latter by the controller 12 to convert the data according to data received from the configurator 16.

As in the aspect implementing two HID peripherals, the data is then transmitted to the conditioner 15 which reconstructs the data table, incorporating the transformed variable data from all the designation peripherals A, B and C, of the first type or of the second type, connected to the recomposer 10.

These data are then transmitted via the communication bus connected to the output 17 in the forms and conditions of the standard relating to designation peripherals, the HID standard in the example, to be seen by the central unit 90 as representative data of the operation of the single active surface 16U.

It can be noted here that the simultaneous use of a graphic tablet and a touch screen is generally not considered.

This situation is however very much linked to the limitation of the current systems which do not allow such simultaneous use effectively and rather considered as disturbing.

Conversely, the recomposer 10 of the disclosure allows an operator to work with a graphic tablet on a touch screen, for example a large touch screen in vertical position, which can consist of several display screen panels and several touch surfaces, and simultaneously one or more other operator(s) to work through direct interactions on the touch screen, as part of a collaborative work.

Furthermore, the recomposer 10 also has the effect of making a second type designation peripheral, communicating nominally according to a different open or proprietary protocol, compatible with a standard such as the HID standard. In fact, thanks to the recomposer of the disclosure, the second type designation peripheral can be used on any computer system compatible with the standard of output of the data managed by said recomposer, and without the need to use a specific driver on the computer system, assuming that this driver is available for said computer system.

It will also be noted here that a HID peripheral with cursors, such as a mouse, is simultaneously usable with other designation peripherals through the recomposer 10, these other designation peripherals can be of all types, touch surfaces, stylus associated with active surfaces, and also other cursor peripherals.

In some configurations, particularly to increase the number of HID peripherals to be connected on a single input of a central unit beyond a number of inputs of the recomposer 10, said recomposer 10 can receive one or more other recomposer(s), each connected on an input of the first recomposer 10, such a cascade mounting allowing, at least in theory, to indefinitely multiply the number of designation peripherals simultaneously connected to the central unit.

Obviously, the number of inputs for connecting designation peripherals to the recomposer is not, at least in theory, limited as long as the corresponding variable data can be put on a single output while remaining compatible with the standard considered.

Advantageously, the recomposer includes at least two inputs in order to make at least two designation peripherals usable simultaneously.

The standard used at the output for transmitting data to the central unit of the computer system is not necessarily the same as that/those used to receive the data at the input of the recomposer.

As an example of implementation, the situation already described of two designation peripherals each including a touch surface is considered.

The two touch surfaces are arranged to form a touch screen, for example each touch surface covering one half of a screen of dimensions larger than those of a touch surface, or else each touch surface covering one screen and the two screens being arranged to form an overall display surface, the two touch surfaces not necessarily being of the same technology, for example a touch surface in capacitive technology and another in optical technology.

Thanks to the recomposer it is possible to carry out operations on the display system, conventional today on a simple touch screen but not achievable in a simple and intuitive way on the considered composite arrangement of touch surfaces.

Example 1: the simple drag: an operator places a finger on one of the touch surfaces and displaces it, for example to draw a line or displace a "grabbed" object. If the path of his finger passes from one touch surface to another, the movement will be perceived by the central unit as the continuous displacement of the finger on a single touch surface without discontinuity. Particularly if for technical reasons a separation exists between the two touch surfaces, the definition of a corresponding "dead" area in the single active surface 16U will ensure the alignment of the paths followed by the finger on the two touch surfaces, the momentary absence of signal which could in this example be considered as a momentary lifting of the finger.

Example 2: simultaneous multiple contacts: an operator places two fingers, one finger on one of the touch surfaces and the other finger on the other touch surface. This double contact does not generate a conflict because it is received by the central unit as a double contact on the same touch surface. Therefore, it will be possible to produce image enlargement or shrinking, image rotation effects, by a coordinated action of sliding the fingers on the touch surfaces considered by the central unit as a single touch surface.

Example 3: collaborative work: an operator performs operations by means of a stylus and an active tablet, these operations taking place on a (simple or composite) touch screen. Another operator interacts simultaneously without conflict by finger contacts on the shapes or other elements generated by means of the stylus and the active tablet.

Thus, the disclosure allows overcoming the defects of the existing solutions by allowing to assemble several existing designation peripherals, if necessary of different technologies, by ensuring the possibility of using them simultaneously in a transparent manner for the computer system whose central unit identifies only one designation peripheral which, however, transmits all the individualised information of the actions carried out on each of the designation peripherals.

It will be understood that the architecture of the recomposer is described as an example in a particular case and that the person skilled in the art may choose to carry out the various functions to be performed by the recomposer of the disclosure by implementing, if necessary, one or more analyser(s), and or one or more controller(s), and or one or more configurator(s), and or one or more conditioner(s). He may also choose to group together some elements or on the contrary to distribute the functions to be performed in different ways without departing from the disclosure.

In one aspect of the disclosure, the recomposer includes several outputs so that it is able to transmit recomposed data to several computers.

The disclosure described in this document is the result of work partially supported by the European Commission in the context of the 7th framework programme under the Magellan grant agreement number 611526.

What is claimed is:

1. A recomposer, for connecting a plurality of designation peripherals to the same central unit of a computer system, said recomposer comprising:
    inputs for exchanging, with each of the designation peripherals, when said designation peripheral is connected to said recomposer, data normally exchanged with the central unit when said designation peripheral is directly connected to said central unit;
    an output for exchanging data with the central unit, when said recomposer is connected to said central unit; and
    digital processing means configured to transform the data received at the inputs of the recomposer into data outputted from the recomposer;
    said output data being compliant in content and in structure to data which would be emitted by a designation peripheral including a single active surface;
    said outputted data characterising individually, at each instant, on the single active surface, actions carried out with the designation peripherals, actions characterised by the data received as inputs,
    and
    wherein the digital processing means includes:
        at least one analyzer configured to extract, from the data received as inputs from each of the designation peripherals connected to said recomposer, a table of variable data and descriptors of said designation peripheral;
        at least one configurator configured to define the dimensions and position of a designation surface associated with each of the designation peripherals connected to said recomposer in a coordinate system of the single active surface;
        at least one controller for transforming variable data of the data received as inputs into variable data of the outputted data; and
        at least one conditioner configured to structure the data to be outputted in accordance with a communication protocol comprised by the central unit to which the recomposer must be connected.

2. The recomposer according to claim 1, wherein the configurator, for each designation surface associated with a designation peripheral connected to the recomposer, defines dimensions and a position in the single active surface of an area corresponding to said active surface associated with the designation peripheral by: a scaling of each of an abscissa axis and of an ordinate axis of said designation surface known in a coordinate system of said designation surface to a coordinate system of the single active surface; and a position of a reference point of said designation surface in the coordinate system of the single active surface.

3. The recomposer according to claim 1, wherein coordinates of a point designated on a designation surface in the coordinate system of a designation peripheral transmitted in the variable data received on an input of the recomposer, or produced by the recomposer from the received variable data, are transformed into coordinates of said point designated on the designation surface, in the coordinate system of the single active surface, and incorporated into the variable data of the data emitted by the output.

4. The recomposer according to claim 1, configured to receive, on at least one input, data conforming to the requirements of an open standard, for example the USB standard and the HID overlay to said USB standard.

5. The recomposer according to claim 1, configured to receive, on at least one input, data defined by a closed protocol called "proprietary" protocol.

6. The recomposer according to claim 1, wherein the outputted data conforming to the requirements of an open standard, for example the USB standard and the HID overlay to said USB standard.

7. The recomposer according to claim 1, wherein at least one input corresponds to a wireless link to which a wireless designation peripheral can connect, for example by a radio link or by an optical link.

8. An assembly including a recomposer according to claim 1 and comprising at least two designation peripherals.

9. The assembly according to claim 8, wherein at least one designation peripheral includes an active surface associated with a touch screen.

10. The assembly according to claim 8, wherein at least one designation peripheral is a stylus associated with a designation surface.

11. The assembly according to claim 8, wherein at least one designation peripheral is a scrolling device whose signals are processed to define a position on a designation surface.

12. A computer system including an assembly in accordance with claim 8, wherein the output of the recomposer is connected to a central unit of said computer system.

13. A method for connecting several designation peripherals to the same central unit in a computer system, to allow the simultaneous interoperability of said designation peripherals, the method comprising the steps of connecting said designation peripherals on inputs of a recomposer according to claim 1 and to connect an output of said recomposer to the central unit so that said designation peripherals connected to said recomposer are seen by said central unit as a single active surface designation peripheral.

14. The method according to claim 13, comprising a step of parameterising the recomposer, said parameterisation step including defining an arrangement of designation surfaces, associated with each of the connected designation peripherals, in the single active surface.

* * * * *